Patented Dec. 3, 1940

2,223,494

UNITED STATES PATENT OFFICE

2,223,494

PRODUCTION OF CYCLIC ALCOHOLS AND KETONES

Donald J. Loder, Wilmington, Del., assignor to E. I. du Pont de Nemours & Company, Wilmington, Del., a corporation of Delaware No Drawing. Application June 6, 1939, Serial No. 277,652

17 Claims. (Cl. 260—586)

This invention relates to the oxidation of cyclic saturated hydrocarbons and more particularly to the production of cyclic alcohols and cyclic ketones by oxidation of cyclic saturated hydrocarbons with an oxygen-containing gas.

According to this invention oxidation of cyclic saturated hydrocarbons with production in good yield of cyclic alcohols and cyclic ketones can be accomplished by subjecting the said hydrocarbons to catalytic oxidation in the liquid phase by means of an oxygen-containing gas, for example oxygen or air or air enriched with oxygen.

In this manner it is possible to oxidize saturated cyclic hydrocarbons, such as cyclohexane, cyclopentane, cyclobutane and the like or homologs such as the methyl-, dimethyl-, ethyl- or like substituted cyclic hydrocarbons, with production in good yields of the corresponding cyclic alcohols and cyclic ketones. While my process may be carried out at various temperatures ranging upward from about 100° C. to about 250° C., generally speaking the use of the lower temperatures, e. g., in the range of about 120°–170° C., tends, other conditions remaining the same, to give less loss of carbon to oxides of carbon.

The cyclic alcohols and cyclic ketones are produced according to my invention by carrying on the oxidation in the presence of an oxidation catalyst, such, specifically as one or more of the solid polyvalent metals having an atomic weight between 50 and 200. For example, I may use such metals in the finely divided metallic state or as organic and inorganic salts or oxides including such specific metals as cerium, cobalt, copper, manganese, and uranium, or mixtures of any two or more of these substances. As specific catalysts under the above description there may be employed cobalt and other metal thiocarbamates, phthalates, naphthenates, oleates, stearates, such as cobalt dibutyldithiocarbamate, cobalt cyclohexyl hexahydrophthalate, or cobalt cyclohexyl phthalate, or vanadium, cerium and cobalt chlorides, cobalt acetate, manganese acetate alone or together with barium acetate, barium or cobalt permanganate, sodium cobalti nitrite or mixtures of two or more of such compounds. In addition to the oxidation catalysts, promoters such as the alkali and alkaline earth metals may also be employed, if desired, such, for example as the barium, magnesium and potassium acetates, butyrates, propionates, and the like.

As a further feature of the invention I have found that, especially when operating at the lower temperatures, say 170° C. or below, the yields and efficiency of the process may be even further improved by carrying on the oxidation in the presence of one or more "initiators," which term I employ herein to designate substances capable of initiating attack on the hydrocarbon molecule which may not readily react with molecular oxygen under my preferred low temperature conditions. For example, there may be employed inorganic peroxides, such as sodium or hydrogen peroxide; organic peroxides, such as benzoyl peroxide; peracids, such as peracetic and perbenzoic acids; the aldehydes, such as acetaldehyde, propionaldehyde, and isobutyraldehyde; ketones, such as acetone, methyl ethyl ketone, diethyl ketone, and cyclohexanone; ethers, such as diisopropyl, diethyl and diamyl ethers; olefins, such as cyclohexene and octylene, and, in fact, any organic compound which tends to form peroxide bodies under the reaction conditions.

The initiator may be added to the reactants at the start or continuously during the oxidation or both; or, if preferred, the oxidation may be started at a temperature and pressure at which some partial oxidation products, capable of being oxidized to or acting as oxygen carriers, are formed and the partially oxidized hydrocarbons thus produced may thereafter act as an oxygen carrier capable of attacking other hydrocarbon molecules at the relatively low temperatures which I have generally outlined and will hereinafter more specifically describe. The constant maintenance of a concentration of initiator is important, however, and therefore, in general, I deliberately add the initiator to the reactants as described hereinafter. The oxygen carrier is thus able to initiate the oxidation which then may become at least partially self-sustaining at temperatures very much lower than otherwise possible.

The proportions of initiators deliberately added at the beginning of operation according to this invention are relatively small, based upon the weight of the hydrocarbon being treated. Thus, I have found that amounts of the order of 0.1 to 0.5 per cent by weight are quite satisfactory, about 0.3% being preferred. Although primarily applicable to ketones such as acetone, dimethyl or methyl ethyl ketones, or cyclohexanone, or mixtures thereof, these quantities describe satisfactorily the amounts of other initiators which are suitable according to my invention.

While the process is operable at ordinary pressures, elevated pressures ranging upwards from about 2 atmospheres to about 50 atmospheres may be utilized successfully. I prefer, however, to use pressures in the more restricted range of 5 to 25 atmospheres. The minimum pressure is that required to permit effecting the reaction in the liquid phase, by which is meant that the hydrocarbon is preferably oxidized in the liquid or dissolved state. Pressures in excess of this minimum may be used, however, since pressure has been found to favor the reaction rate.

Having described separately some of the features of my invention, the following description will illustrate by example of cyclohexane oxidation how these features may be combined for oxidation of saturated cyclic aliphatic compounds generally.

Example 1

A mixture containing 1008 grams of cyclohexane, 3.0 grams cyclohexanone initiator, 0.5 gram cobalt naphthenates catalyst was charged into an autoclave constructed of an alloy containing chromium, nickel, and molybdenum, of one gallon capacity, provided with suitably valved gas outlet and inlet lines at top and bottom respectively. (The mixture of cobalt naphthenate was prepared by heating for one hour at 150° C. a mixture of 24.9 parts by weight of a mixture of $Co(C_2H_3O_2)_2.4H_2O$ and 44 parts by weight of a mixture of naphthenic acids having an acid equivalent of about 220. The molten mass is chilled, by pouring into water at room temperature, dried, and ground to a fine powder.) The mixture was heated to 145° under a pressure of 350 pounds and air was bubbled through the mixture for 113 minutes at the rate of $\frac{1}{10}$ cu. ft. per min. per kg., the pressure being maintained at 350 pounds and the temperature at 145°. The exit gas was directed through a condenser and traps cooled by dry ice. 137 grams of cyclohexane were oxidized and 148 grams of cyclohexanol+cyclohexanone were recovered.

Example 2

A mixture containing 5517 grams of cyclohexane, 16.7 grams of cyclohexanone initiator and 2.8 grams of cobalt naphthenates catalyst as described in Example #1 was charged into an autoclave constructed of an alloy containing nickel, chromium, molybdenum and copper, and known under the name of "Colonial U" of dimensions 5'×4" internal diameter provided with suitably valved gas outlet and inlet lines at top and bottom respectively. The mixture was heated to 145° C. under a pressure of 150 pounds per sq. in. and air bubbled through the mixture for 111 minutes at the rate of .08 cu. ft. per minute per kg., the pressure being maintained at 150 pounds and the temperature at 145° C. The exit gas was directed through a condenser and traps cooled by dry ice. 569 grams of cyclohexane were oxidized and 534 grams of cyclohexanone+cyclohexanol were recovered.

Example 3

A mixture containing 1871 grams of cyclohexane, 5.6 grams cyclohexanone initiator 0.9 gram cobalt naphthenates catalyst such as described in Example #1 was charged into an autoclave such as described in Example #2, provided with suitably valved gas outlet and inlet lines at top and bottom respectively. The mixture was heated to 145° C. under a pressure of 500 lbs. per sq. in. and air was bubbled through the mixture for 143 minutes at the rate of .08 cu. ft. per min. per kg., the pressure being maintained at 500 pounds and temperature at 145° C. The exit gas was directed through a condenser and trap cooled by dry ice. 194 grams of cyclohexane were oxidized and 165 grams of cyclohexanol+ cyclohexanone were recovered.

Example 4

A mixture containing 100 grams of cyclohexane and 0.05 gram of manganese naphthenates catalyst, prepared similarly to that of Example #1, stabilized with isobutyl methacrylate, was charged at the rate of 5 grams per minute into a nickel tube 60 ft. long with $\frac{1}{8}$" internal diameter provided with suitably valved outlet and inlet lines at each end respectively. The mixture was heated to 210° C. and air was bubbled through the mixture at the rate of 5 cu. ft. per minute per kg., the pressure being maintained at 500 lbs. and the temperature at 210° C. The exit gas was directed through a condenser and trap cooled by dry ice. On the basis of 100 g. charged, 3.9 grams of cyclohexane were oxidized and 3.6 grams of cyclohexanone+cyclohexanol were recovered.

Although specific disclosure has been made in the examples of methods for carrying on my invention in a batch process, it should be understood that this invention may also be practiced in a continuous manner. Thus, after completion of the oxidation, such as shown in the specific examples, the materials (cyclic hydrocarbon, alcohol and ketone) capable of being converted to the desired cyclic alcohol and ketone, plus the catalyst and initiator, may be recovered and recycled to the reaction zone together with further quantities of cyclic hydrocarbon. In a continuous process it will also be found desirable to make such additions of catalyst and initiator as will maintain the reaction rate and yield of cyclic alcohol and ketone at the desired high degree.

While the process as described in the examples involves passage of the oxidizing gas through a body of liquid, it will be understood that other means of assuring the desired liquid-gas contact may be employed, as, for example, passage of liquid and gas co-current or counter-current through a tube or tower, which may be supplied with plates, packing or other devices for enhancing contact.

I claim:

1. A process for the production of cyclic alcohols and ketones which comprises subjecting a saturated cyclic hydrocarbon to oxidation in the liquid phase and at a temperature of from 100° C. to 250° C., by means of an oxygen-containing gas and in the presence of an oxidation catalyst.

2. A process for the production of cyclic alcohols and ketones which comprises subjecting a saturated cyclic hydrocarbon to oxidation in the liquid phase by means of an oxygen-containing gas in the presence of an oxidation catalyst at a temperature of 100 to 250° C. and a pressure of 2 to 50 atmospheres.

3. A process for the production of cyclic alcohols and ketones which comprises subjecting a saturated cyclic hydrocarbon to oxidation in the liquid phase by means of an oxygen-containing gas and in the presence of an oxidation catalyst and a ketone.

4. A process for the production of cyclic alcohols and ketones which comprises subjecting a saturated cyclic hydrocarbon to oxidation in the liquid phase by means of an oxygen-containing gas in the presence of a cobalt naphthenate oxidation catalyst and a ketone at a temperature of 100 to 250° C. and a pressure of 2 to 50 atmospheres.

5. A process for the production of cyclic alcohols and ketones which comprises subjecting a saturated cyclic hydrocarbon to oxidation in the liquid phase by means of an oxygen-containing gas in the presence of a cobalt naphthenate oxidation catalyst and a ketone at a temperature of 120 to 170° C. and a pressure of 5 to 25 atmospheres.

6. A process for the production of cyclic alcohols and ketones which comprises subjecting cyclohexane to oxidation in the liquid phase and at a temperature of from 100° C. to 250° C., by means of an oxygen-containing gas in the presence of an oxidation catalyst.

7. A process for the production of cyclic alcohols and ketones which comprises subjecting cyclohexane to oxidation in the liquid phase by means of an oxygen-containing gas in the presence of a cobalt naphthenate oxidation catalyst and a ketone at a temperature of 100 to 250° C. and a pressure of 2 to 50 atmospheres.

8. A process for the production of cyclic alcohols and ketones which comprises subjecting cyclohexane to oxidation in the liquid phase by means of an oxygen-containing gas in the presence of a cobalt naphthenate oxidation catalyst and cyclohexanone at a temperature of 100 to 250° C. and a pressure of 2 to 50 atmospheres.

9. A process for the production of cyclohexanol and cyclohexanone which comprises subjecting cyclohexane to oxidation in the liquid phase by means of an oxygen-containing gas in the presence of a cobalt naphthenate catalyst and a relatively small quantity of from 0.1 to 0.5% by weight of cyclohexanone (based upon the cyclohexane) at a temperature of 120 to 170° C. and at a pressure of 5 to 25 atmospheres.

10. A process for the production of cyclic alcohols and ketones which comprises subjecting a saturated cyclic hydrocarbon to oxidation in the liquid phase at a temperature of from 100 to 250° C. by means of an oxygen-containing gas and in the presence of an oxidation catalyst and an oxidation initiator selected from the group consisting of peroxides and compounds capable of forming peroxides under the reaction conditions.

11. A process for the production of cyclic alcohols and ketones which comprises subjecting a saturated cyclic hydrocarbon to oxidation in the liquid phase at a temperature of from 100 to 250° C. and at a pressure of 2 to 50 atmospheres, by means of an oxygen-containing gas and in the presence of an oxidation catalyst and an oxidation initiator selected from the group consisting of peroxides and compounds capable of forming peroxides under the reaction conditions.

12. A process for the production of cyclic alcohols and ketones which comprises subjecting a saturated cyclic hydrocarbon to oxidation in the liquid phase at a temperature of from 120 to 170° C. by means of an oxygen-containing gas and in the presence of an oxidation catalyst and an oxidation initiator selected from the group consisting of peroxides and compounds capable of forming peroxides under the reaction conditions.

13. A process for the production of cyclic alcohols and ketones which comprises subjecting a saturated cyclic hydrocarbon to oxidation in the liquid phase at a temperature of from 120 to 170° C. and at a pressure of from 5 to 25 atmospheres, by means of an oxygen-containing gas and in the presence of an oxidation catalyst and an oxidation initiator selected form the group consisting of peroxides and compounds capable of forming peroxides under the reaction conditions.

14. A process for the production of cyclic alcohols and ketones which comprises subjecting cyclohexane to oxidation in the liquid phase by means of an oxygen-containing gas in the presence of an oxidation catalyst and an oxidation initiator selected from the group consisting of peroxides and compounds capable of forming peroxides under the reaction conditions, the reaction being conducted at a temperature of from 100 to 250° C.

15. A process for the production of cyclic alcohols and ketones which comprises subjecting cyclohexane to oxidation in the liquid phase by means of an oxygen-containing gas in the presence of an oxidation catalyst and an oxidation initiator selected from the group consisting of peroxides and compounds capable of forming peroxides under the reaction conditions, the reaction being conducted at a temperature of from 100 to 250° C. and at a pressure of from 2 to 50 atmospheres.

16. A process for the production of cyclic alcohols and ketones which comprises subjecting cyclohexane to oxidation in the liquid phase by means of an oxygen-containing gas in the presence of an oxidation catalyst and an oxidation initiator selected from the group consisting of peroxides and compounds capable of forming peroxides under the reaction conditions, the reacting being conducted at a temperature of from 120 to 170° C. and at a pressure of from 5 to 25 atmospheres.

17. A process for the production of cyclic alcohols and ketones which comprises subjecting cyclohexane to oxidation in the liquid phase by means of an oxygen-containing gas in the presence of a cobalt naphthenate oxidation catalyst and an oxidation initiator selected from the group consisting of peroxides and compounds capable of forming peroxides under the reaction conditions, at a temperature of 100 to 250° C. and a pressure of 2 to 50 atmospheres.

DONALD J. LODER.